United States Patent [19]
Ellison

[11] 3,830,268

[45] Aug. 20, 1974

[54] LOADING MULTIPLE DUPLICATING MACHINES

[75] Inventor: Jack R. Ellison, Hickory, N.C.

[73] Assignees: Jack R. Ellison; Vanda Ray Williams

[22] Filed: July 30, 1973

[21] Appl. No.: 384,050

[52] U.S. Cl. .................................................. 142/4
[51] Int. Cl. ............................................. B27c 9/00
[58] Field of Search ............ 142/3, 4, 5, 55; 144/24, 144/25, 26, 2, 46, 47, 48, 45

[56] References Cited
UNITED STATES PATENTS

| | | | |
|---|---|---|---|
| 1,705 | 7/1840 | Clark, Jr. | 142/4 |
| 649,655 | 5/1900 | Brenner | 142/4 |
| 1,277,203 | 8/1918 | Ensign | 142/55 |
| 1,281,569 | 10/1918 | Hillerich | 142/55 |
| 2,087,897 | 7/1937 | Bradley | 142/4 |
| 2,787,297 | 4/1957 | Geiger | 142/55 |

Primary Examiner—Harrison L. Hinson
Attorney, Agent, or Firm—James E. Britt

[57] ABSTRACT

According to this invention a multiple carving machine in which a large number of work pieces are to be carved at one time is provided with a horizontally spaced series of chucks and work piece supporting tables coextensive with the chuck series having fluid operated means to raise and lower the tables, with adjustable stop switches in a fluid supply circuit to correctly position vertically, unmarked work pieces disposed at chucking points along the tables, also restraining pins along said tables adjustable to contact opposite sides of the ends of work pieces to correctly position horizontally said work pieces with respect to chuck centers so that by simultaneously operating the chucks by fluid actuated means all of the positioned unmarked work pieces may be simultaneously and accurately chucked at one time.

9 Claims, 5 Drawing Figures

LOADING MULTIPLE DUPLICATING MACHINES

LOADING A MULTIPLE DUPLICATING MACHINE

This invention relates to a method of loading a duplicating machine in which a plurality of work pieces are chucked into holding means for simultaneously performing duplicate operations on the several work pieces. It further relates to provide suitable parts arranged in such a manner as to load a machine designed to accommodate a large number of work pieces in an expeditious and accurate manner.

The machines usually embody oppositely disposed head and tail stock assemblies, the head stock assembly carrying live center spindles and the tail stock assembly carrying dead center spindles. In machines having a large number of spindles in the head and tail stock assemblies, the assemblies extend for a considerable length in a horizontal plane carrying a series of spindles spaced apart in their respective horizontal planes.

Generally work pieces processed in spindle machines are chucked along their longest dimension. But even though there are exceptions, the descriptions herein will be based on the general rule.

There is a problem in loading a large number of work pieces in a sufficiently accurate position to assure that the machine will exactly duplicate the operation on all of the pieces at the same time. To do this, a process must be employed to assure that the spindles will engage the work pieces at predetermined centers on their ends. One method of accomplishing this is to countersink recesses in the work pieces at the point at which the spindles are to engage the respective work pieces. This countersinking requires a separate and independent operation on special equipment.

Contemporary practice follows this method of dividing the loading operation into two parts. The first part is to countersink recesses into the ends of the work pieces for the center points of the chuck spindles to enter. The other part is to load the work pieces, one at a time, by placing one of the recesses over the point of the chucking center for that end and subsequently moving the other chucking center into the other recess and against the end of the work pieces with sufficient force to hold it for the carving operation. This method consumes considerable time.

It is assumed that some such method is used by Geiger, U.S. Pat. No. 2,787,297 because no means is provided to determine a definite horizontal position.

Another method, the one to which this invention is directed, is to first definitely position the work pieces with respect to the chucking centers and then force the centers into engagement with the work pieces at a definite point. This may be done on unmarked work pieces having no countersinks. To accomplish this, a definite and positive positioning of the work pieces in at least two directions must be employed such as vertically and horizontally.

It is an object to eliminate the countersinking of recesses in work pieces to be loaded in a carving machine to make possible the accurate chucking of plain or unmarked pieces, that is pieces without countersunk marks.

It is another object of this invention to reduce the positioning of work pieces to a single step in the loading of a multiple carving machine.

It is another object to combine multiple fluid chucking with single step positioning to accomplish rapid loading of a multiple carving machine.

Another object is to devise a method of quickly and accurately loading a plurality of unmarked work pieces in a multiple carving machine or the like.

Another object is to provide a method of accommodating a very large number of work pieces to be chucked in a horizontal plane for multiple carving, by arranging for simultaneous positive positioning both horizontally and vertically immediately preceding the chucking operation.

A further object is to first accurately hold work pieces against both vertical and horizontal movement and then accomplish a multiple chucking operation simultaneously.

A still further object is to provide in a machine designed to process a large number of work pieces arranged horizontally in serial order, a single horizontally extending support member or table disposed adjacent to correspondingly serially spaced chucking means and arranged to serve temporarily as support for ends of the work pieces as they are chucked and which will be rotated during the work process.

In addition, it is an object to provide the single horizontally disposed support member with the capability of serving as a continuing support for other types of work pieces, such as flat stock, which will be processed in a fixed position. These and other objects will be more readily understood from the following description, claims and drawings in which:

Figure 1:
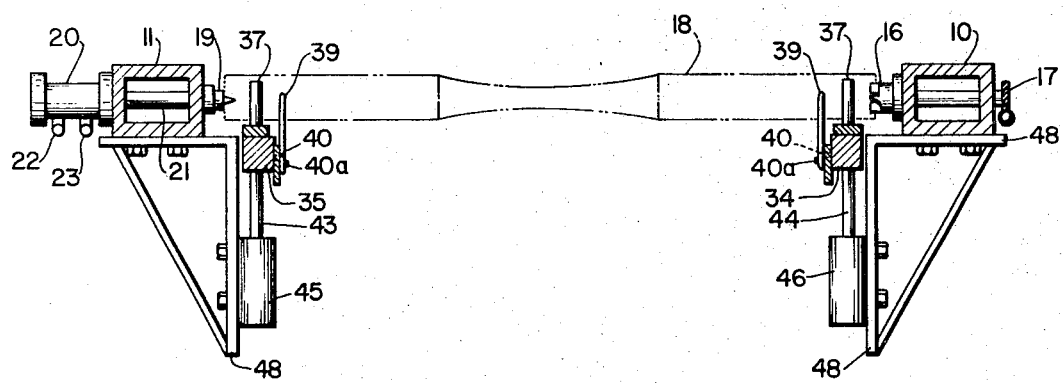
FIG. 1 is a cross sectional view showing means for positioning the work pieces and for chucking the same.

Referring to the drawings, since the type of machine in which this invention may be embodied as an improvement is well known in the art of multiple carving machines, only the essential parts with which these improvements are associated are illustrated.

Figure 4:
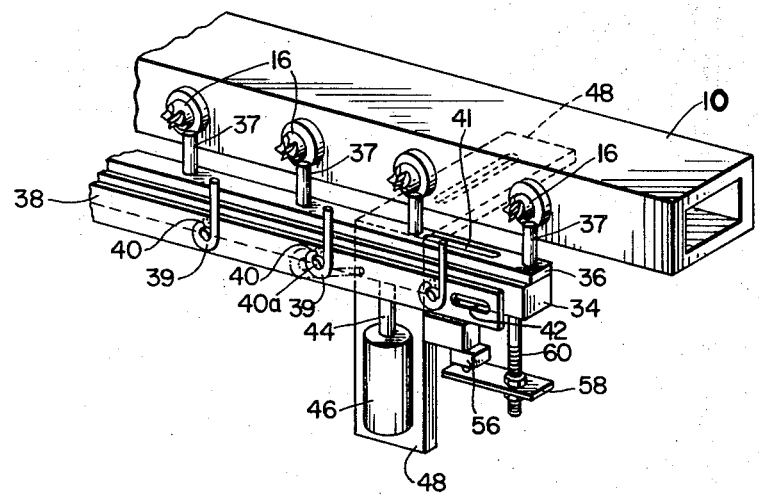
FIG. 4 is a pictorial view of the essential features of a head stock and the combined adjustable supporting table and aligning bar associated therewith.
Figure 2:
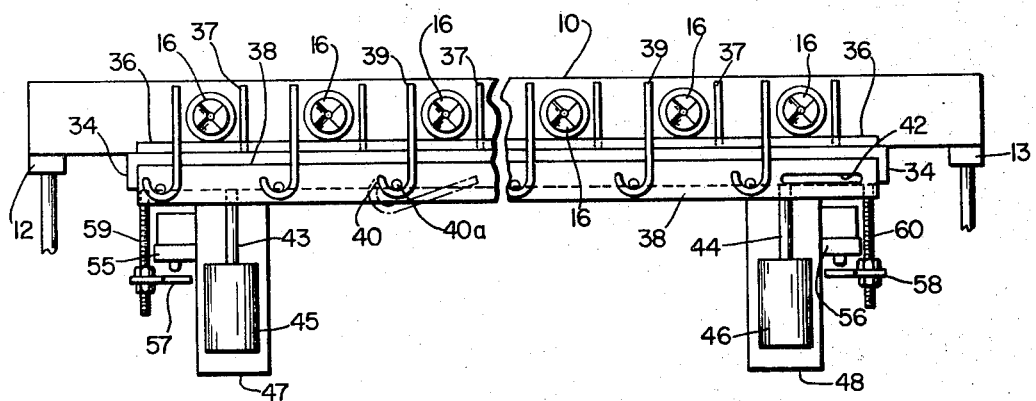
FIG. 2 is a broken view of a head stock member and parts associated therewith.
Figure 3:
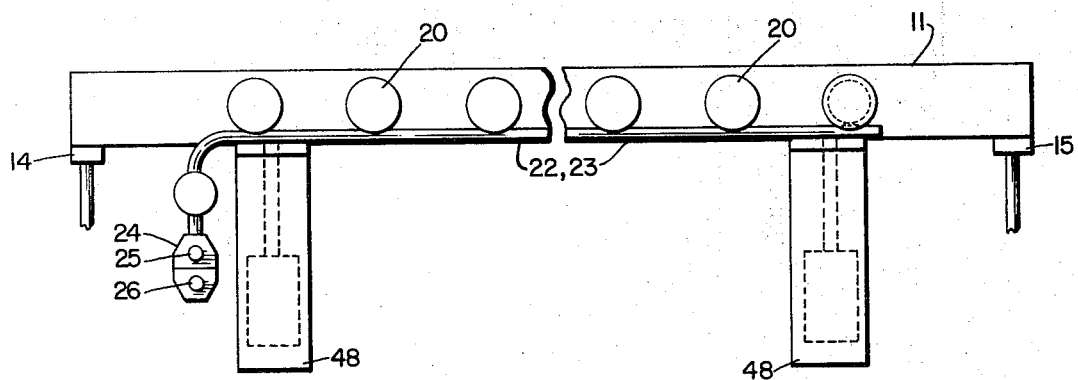
FIG. 3 is a broken view, similar to FIG. 2, of a tail stock member and the parts including symbolized control switches associated therewith.

The illustration consists of head stock beam 10, shown in FIGS. 1, 2 and 4, a tail stock beam 11, shown in FIGS. 1 and 3 and supported in the machine at their ends by a part of the main frame of the machine, simulated in the drawings as supports 12 and 13 for beam 10 supports 14 and 15 for beam 11.

The head stock beam 10 is provided with multiple live center chucks 16 arranged in horizontal series and which may be rotated by any suitable means simulated as screw and worm wheel means at 17 to properly position the work pieces 18 for each succeeding carving stroke. The tail stock 11 is provided with multiple dead center chucks 19 corresponding to the head stock chucks 16.

The chucking is done after being properly positioned, as hereinafter described, by forcing the respective dead centers 19 into the ends of each work piece 18 and simultaneously forcing the work piece onto the head stock chuck center 16 to hold the work pieces for carving or other type of operation.

A series of chuck actuating cylinders 20 are mounted on the outer face of tail stock beam 11 as shown in FIGS. 1 and 3. Dead center chucks 19 are carried on an extension 21 of the piston rods extending out of cylinders 20 and movable transversely of the beam by the pistons in the cylinders. The pistons are moved by fluid suitably admitted to the cylinders from fluid lines 22 and 23 leading from a suitable source. These lines connect to all the cylinders 20 on a beam to simultaneously admit and receive fluid from the cylinders. The fluid flow may be accomplished by any suitable means. Control for this is simulated by control box 24 in which a push button 25 operates means to admit fluid under pressure to line 22 and thence to the space at the head of the cylinders and receive exhaust fluid from line 23 connected to the space at the rod end of cylinders to move the chucking centers in against the ends of the work pieces 18.

Push button 26 operates means to reverse the fluid flow to withdraw the chucking centers from the work pieces and release the work pieces from the chucks.

However, as suggested above, the normal procedure in loading duplicating machines includes the making of center countersinks or recesses in the stock work pieces and then engaging the chucking centers in the recesses. But, according to this invention, this step is omitted and yet accurate chucking is obtained by providing definite supporting and positioning means of a type now to be described.

In the present state of the art as many as 15 or 20 or more work pieces are worked in one section of a carving machine. The method of loading according to this invention, is provided by a pair of horizontally extending aligning table members or bars 34 and 35 disposed adjacent to the live and dead center chucks respectively. Since these tables are constructed in opposite pairs, the details of only one will be set forth.

Referring now to FIGS. 1, 2 and 4, support table bar 34 is the one shown and is the primary member of a supporting and positioning arrangement. One horizontal support table member can support and align a great many work pieces when the chucking centers are serially grouped horizontally and provides supporting and aligning means for chucking work pieces in its most simple form.

On top of table bar 34 is a strip 36 having a series of upright stop pins 37 corresponding to the chucking centers. Stop pins 37 are removably secured to strip 36 by some such means as being screwed into threaded holes. On the side of table bar 34 is a strip 38 carrying a like number of spring type stop pins 39 yieldable longitudinally of the aligning table bar 34 or transversely of a work piece in position to be chucked. Strips 36 and 38 are both adjustably secured to bar 34 by sutable means such as a screw and slot at 41 and 42. This provides means for adjusting the positioning stop pins 37 and 39 to suit the size of the work piece. Also the employment of the arrangement just described provides horizontal or sidewise adjustment of a definite positioning means.

Support table 34 and its strips 36 and 38 are coextensive with beam 10 or 11 as the case may be, to accommodate in one assembly all of the chucking centers of a pair of beams.

Stationary pins 37 will form a firm horizontal stop for one side of each work piece. Spring pins 39 will form a yieldable horizontal stop for the other side of each work piece. This combination will keep the work pieces definitely positioned with respect to pin 37 and at the same time accommodate work pieces which may vary slightly in size.

Spring pin 39 embodies a special feature. It is pivoted at 40 with a stop pin 40a. This arrangement permits spring pin 39 to be rotated, when desired, down to the dotted line position shown, below the level of the support table 34. The function of this feature will appear in the description below.

Figure 5:
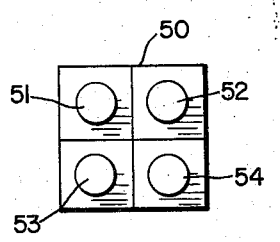
FIG. 5 is a symbolic view of the control switches for the combined support and aligning bar table.

To provide vertical adjustment of a positioning means the table 34 is mounted on the upper ends of the piston rods 43 and 44 of two vertically positioned cylinders 45 and 46 mounted on brackets 47 and 48. The piston rods 42 and 44 move the support table 34 and its strips up and down. They are actuated by fluid control means symbolized by a control box 50 shown in FIG. 5 in which push buttons 51 and 52 control means for admitting fluid below and exhausting fluid from above the pistons to move the piston rods 43 and 44 upward. Push buttons 53 and 54 control means operating in reverse of the up means to move the pistons and rods down.

In their downward travel the piston rods 43 and 44 make a full stroke lowering the support table 34 and its strips 36 and 38. The length of the downward stroke of the piston rods of suitable length will be sufficient to move the support table 34 completely out of the way of any later movement of the work pieces as they are being processed.

Limit switches 55 and 56 are used to stop support table 34 in just the right position to align the work pieces with the chucks to grip the work pieces at the desired point. This would be the loading position for a particular type and size of work piece. Limit switches 55 and 56 are mounted on extension ears of piston carrying brackets 47 and 48. The limit switches are actuated by arms 57 and 58 adjustably mounted on threaded rods 59 and 60 attached to table bar 34 and move up and down with it. As the piston rods carry the table bar upward, the arms move up with them until they come against the actuating buttons of the limit switches causing them to act to immediately cut off the fluid flow to and away from piston cylinders 45 and 46. This will stop the table movement at the elevation for a particular type of work piece. A more accurate position may be had by adjusting one or both arms 57 and 58 up or down to cause the chucks to engage the work piece at just the right point.

A large part of the carving done on machines of the type to which this invention is directed will be performed on work pieces which are chucked, followed by moving the support table down out of the way to permit the work pieces to be rotated as succeeding carving strokes take place.

However, according to this invention the support table 34 may be left in place to serve as a continuing support during the work process. This is desirable when working flat stock on which the carving is done on the upper face and perhaps the edges only and held in a fixed position during the process. Heretofore separate attachable supporting tables have been employed. They were attached by build up or other means to support the stock during flat stock runs. These then had to be removed to go back to processing rotated stock.

The table 34 is merely brought up to the preset limit switch position aligning the stock for chucking. The table then remains in this position for the carving of each loading of flat stock and for loading and carving as many loads as desired.

Handling very wide stock is provided for. When required, stock can be loaded in alternate chucking positions. In this case every other firm stop pin 37 may be removed and every other corresponding spring stop pin 39 may be pivoted down to the dotted line position shown in FIGS. 2 and 4, below the surface of support table 34 and strip 36. This will give a support table space equal to double the space of the chucks in beams 10 and 11. All of this is accomplished without substituting or changing any of the basic structured items.

The operation of a carving machine with these improvements will now be described.

When a multiple carving machine with the carving positions laid out in horizontal sequence is equipped with the improvements of this invention, the machine may be rapidly and easily loaded with unmarked work pieces. The support tables 34 and 35 are raised to approximately the right height for a sample of the shape and size work piece stock to be loaded. Next, the stop pins 37 and 39 are adjusted to open a space at chucking position for the work piece sample. Next, place the sample in position, adjust the limit switch arms to stop the table when the sample is at the position for the chuck center to enter the end of the work piece at the right vertical point. Next, the sample work piece is shifted sidewise on the table until the stock is positioned horizontally for the chuck points to enter at the right horizontal point. When the two points coincide, the strips 36 with the stop pin 37 are shifted until the stop pin is in firm contact with one side of the work piece. This is followed by shifting strip 38 and spring pin 39 into snug contact with the work piece on the other side. Of course, adjustments are being made for table 35 at the other end of the work piece.

Ordinarily position adjustments are made with a sample work piece in each of two positions along the support table, preferably near a point over the lift cylinders 45 and 46.

After the positioning adjustments have been made, rapid loading may now proceed. Unmarked stock work pieces are placed in spaces on the table 34 between stops 37 and 39 at each chucking position. Then the operator presses button 25 which actuates the fluid control means to all of the cylinders 20 in a machine unit to simultaneously carry all of the chucks at the dead center end up against the face of that end of the stock and at the same time force the other end of the stock onto the chucks at the live center end.

The work pieces are now chucked into the machine for carving. Before carving begins for work pieces which are to be carved all around, the support tables must be moved away. According to this invention the support tables are moved downward for this. By pressing control switches 53 and 54 means are actuated to cause pistons and associated rods 43 and 44 to make their downward stroke carrying the support table 34 to its low position. This then gives ample room for movement of the work pieces to accommodate the carving operation.

However, when the work piece stock is flat and is to be carved on only one face, including perhaps the edge, the support table is not lowered, but remains in raised aligning and chucking position and furnishes a steady rest for the carving process. The steps for chucking flat stock are otherwise the same as for regular stock unless the stock work pieces are wider than spacing provided in normal set up. In such cases work pieces are chucked only in alternate positions and stop pins 37 and 39 having been moved away from the other positions as described above without otherwise altering the set up.

It is to be noted that this invention provides for rapid loading, using unmarked stock, with a high degree of accuracy because the stock is held in a definite position. It takes place rapidly because it is faciliated by fluid operated chucks connected in parallel to a fluid supply. It can function properly for a large number of work pieces, say 15 to 20 or more, because the aligning support table extends horizontally as a continuous piece coextensive with the horizontally disposed chuck series. It provides for handling flat stock work pieces without having to add structural items to the machine.

It will be understood that a typical embodiment has been used to illustrate my invention, and that various other forms and modifications may be employed without departing from the spirit or scope of the invention.

I, therefore, particularly point out and state that I claim:

1. In a combination for rapidly loading a multiple carving machine designed to carve, for each load, a plurality of work pieces at one time, said arrangement comprising a pair of oppositely disposed horizontal beams, the one carrying serially spaced live center chucks, the other correspondingly opposed dead center chucks, between the two of which the several work pieces are to be chucked, a pair of horizontally extending support table bars, one adjacent to each end of the work pieces and coextensive with the chuck series, means to adjust the elevation of the support table to position the work pieces vertically, stops adjustable along the support tables to restrain the work pieces against horizontal movement on the tables to position the work pieces horizontally, the two positioning means cooperating to so position the ends of unmarked work pieces that the chuck centers will engage the ends of the work pieces at center points determined by their positioning, fluid cylinder means for operating the chucks, and cylinders being connected in a fluid circuit, fluid control means to cause the fluid in the circuit to quickly actuate all the cylinders and cause the chucks to engage accurately all of the work pieces at one time and hold them for the carving operation, said fluid control also operable to reverse the fluid flow to the cylinders and release the chucks from work pieces all at one time.

2. A loading combination according to claim 1 in which the chuck operating cylinders are connected in parallel in a fluid circuit for simultaneous operation of all the chucks.

3. A loading combination according to claim 1 in which the stops for restraining horizontal movement along the support table are mounted on strips adjustably secured to said table and shiftable longitudinally thereof so that the stops may be adjusted to rest snuggly on opposite sides of work pieces as they position the same for chucking.

4. A loading combination according to claim 3 in which one of the strips carries stops rigidly secured thereto and arranged to fit firmly against one side of the work pieces and the other of the strips carrying stops movably secured thereto to rest yieldably against the other side of the work pieces to allow for a slight variation of work pieces from a basic size.

5. In a combination according to claim 4 in which the stops secured to the strips on the support table may be removed or turned out of the way to provide a larger than normal space on the support to accommodate stock of a size too large to be accommodated in spaces normally provided on that machine.

6. In a combination according to claim 5 in which the larger than normal space for accommodating large work pieces is provided by having a pivotal mount for the stop pins on one of the support table strips arranged to permit the pins to be pivoted into an up and down position, said mount arranged to hold the pins yieldably against the side of work pieces when in an upright position and completely away from work pieces when in a down position.

7. In a combination according to claim 1 in which the means for adjusting the elevation of each of the support tables comprise a pair of spaced apart fluid cylinders with vertically extending piston rods to which the table is attached, the stroke of said piston rods being of such length that when in a downward position the support table is lowered out of the way of work pieces when they are revolved to properly position them for succeeding carving strokes.

8. In a combination according to claim 7, having fluid control means for controlling the travel of the piston rods thence the elevation of tables, said fluid control means embodying adjustable limit switches which may be adjusted to stop the travel of the rods to position work pieces on the tables at just the desired vertical point with respect to chuck centers, said stopping operation being accompished by an adjustable actuator for the limit switches.

9. In a combination according to claim 1 in which the work piece supporting tables and their associated parts are mounted on brackets secured to the chuck carrying beams, said brackets being secured to said beams with mounts adjustable transversely of said beams, to provide for varying the transverse distance between the chucks and the support tables.

* * * * *